(12) United States Patent
Luna et al.

(10) Patent No.: US 10,245,723 B2
(45) Date of Patent: Apr. 2, 2019

(54) PORTABLE DRY CHEMICAL DELIVERY ROBOT

(71) Applicants: Jose Luna, Midland, TX (US); Burl Fuller, Midland, TX (US); Jerry Fuller, Midland, TX (US)

(72) Inventors: Jose Luna, Midland, TX (US); Burl Fuller, Midland, TX (US); Jerry Fuller, Midland, TX (US)

( * ) Notice: Subject to any disclaimer, the term of this patent is extended or adjusted under 35 U.S.C. 154(b) by 176 days.

(21) Appl. No.: 15/620,873

(22) Filed: Jun. 13, 2017

(65) Prior Publication Data

US 2018/0354123 A1    Dec. 13, 2018

(51) Int. Cl.
*B65D 88/30* (2006.01)
*B25J 9/16* (2006.01)
*B25J 9/00* (2006.01)
*B25J 9/10* (2006.01)
*B66F 9/06* (2006.01)
*B65D 88/32* (2006.01)

(52) U.S. Cl.
CPC ........... *B25J 9/1602* (2013.01); *B25J 9/0021* (2013.01); *B25J 9/0078* (2013.01); *B25J 9/102* (2013.01); *B65D 88/30* (2013.01); *B65D 88/32* (2013.01); *B66F 9/063* (2013.01)

(58) Field of Classification Search
CPC ........ B65D 90/12; B65D 90/14; B65D 90/18; B65D 90/20; B65D 88/30; B65D 88/32; B66F 9/063; B25J 9/1602
See application file for complete search history.

(56) References Cited

U.S. PATENT DOCUMENTS

| | | | | | |
|---|---|---|---|---|---|
| 2,678,738 | A | * | 5/1954 | Mangrum | B65D 88/26 222/567 |
| 4,451,153 | A | * | 5/1984 | Warnock | E01C 19/1022 366/102 |
| 4,571,143 | A | * | 2/1986 | Hellerich | B65D 88/30 410/68 |
| 4,586,865 | A | * | 5/1986 | Hansen | B60P 1/36 414/519 |
| 4,836,421 | A | * | 6/1989 | Miyoshi | B65D 88/30 206/598 |
| 5,339,996 | A | * | 8/1994 | Dubbed | B28C 7/0046 182/186.6 |
| D438,683 | S | * | 3/2001 | Eltvedt | D34/19 |
| 6,425,529 | B1 | * | 7/2002 | Reinsch | A01M 7/0092 239/10 |
| 6,910,443 | B2 | * | 6/2005 | Rasmussen | A01K 5/0225 119/52.1 |

(Continued)

*Primary Examiner* — Kaitlin S Joerger (74) *Attorney, Agent, or Firm* — Buskop Law Group, P.C.; Wendy Buskop (57) ABSTRACT

A portable dry chemical delivery robot comprised of a cart, a hoist mounted to the top brace; a moveable hopper with a flared inlet tapering to an outlet and connected to the hoist and contained within the cart, a screw conveyor connected to the outlet of the moveable hopper, a motor with transmission connected to the screw conveyor with a remote power supply, a flow controller connected to the motor for regulating operation of the screw conveyor, the flow controller being in communication with a network for providing both local and remote control of the screw conveyor from at least one client device connected to the network.

6 Claims, 9 Drawing Sheets

(56) References Cited

U.S. PATENT DOCUMENTS

| | | | | |
|---|---|---|---|---|
| 7,287,946 B2* | 10/2007 | Bonerb | ............... | B65B 69/0083 |
| | | | | 414/403 |
| 8,529,160 B2* | 9/2013 | Ambriz | ................. | B65D 88/26 |
| | | | | 406/151 |
| 8,690,088 B1* | 4/2014 | Lassota | .................... | A47J 42/38 |
| | | | | 241/100 |
| 9,580,238 B2* | 2/2017 | Friesen | ................. | B65D 88/54 |
| 2003/0111134 A1* | 6/2003 | Sheehan | ............... | B65D 88/32 |
| | | | | 141/234 |
| 2004/0069808 A1* | 4/2004 | Blain | ...................... | B65G 3/04 |
| | | | | 222/185.1 |
| 2004/0190799 A1* | 9/2004 | Hess | .................. | B65B 69/0083 |
| | | | | 383/66 |
| 2005/0276155 A1* | 12/2005 | Harris | ................ | B01F 15/0217 |
| | | | | 366/19 |
| 2009/0129903 A1* | 5/2009 | Lyons, III | ................. | B60P 1/56 |
| | | | | 414/332 |
| 2013/0315698 A1* | 11/2013 | DiSandro | ............... | B65G 67/02 |
| | | | | 414/572 |
| 2014/0008361 A1* | 1/2014 | Nguyen | ............... | A01K 5/0225 |
| | | | | 220/9.4 |
| 2014/0110425 A1* | 4/2014 | Pahl | ..................... | E21B 21/062 |
| | | | | 222/1 |
| 2018/0148255 A1* | 5/2018 | Snape | .................... | B65D 88/20 |

* cited by examiner

FIG 6

PORTABLE DRY CHEMICAL DELIVERY ROBOT

FIELD

The present embodiment generally relates to a portable dry chemical delivery robot.

BACKGROUND

A need exists for an automatic way of delivering dry chemicals without the need of humans coming in contact with the dry chemicals.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present embodiment generally relates to a portable dry chemical delivery robot.

A portable dry chemical delivery robot includes a cart.

The cart includes a rear frame comprising a vertical guide with aligned pin holes and two rear frame wheels; a bottom brace assembly attached at a right angle to the rear frame, comprising two angled wheels configured to support both the rear frame and bottom brace and two bottom brace wheels for supporting the bottom brace and a U brace integral with and extending from a plane of the bottom brace assembly; a first vertical support and a second vertical support, connected to the bottom brace assembly; a top frame connected to the rear frame and to each of the first and second vertical supports; and a sliding locking assembly attached to the pair of vertical supports for sliding up and down the vertical supports.

The portable dry chemical delivery robot includes a hoist mounted to the top central brace.

In embodiments, the portable dry chemical delivery robot includes a moveable hopper with a flared inlet tapering to an outlet. The moveable hopper is connected to the hoist and contained within the cart.

A screw conveyor is connected to the outlet of the moveable hopper.

A motor with transmission is connected to the screw conveyor. The motor is engaged by a remote power supply.

A flow controller is connected to the motor for regulating operation of the screw conveyor. The flow controller is in communication with a network for providing both local and remote control of the screw conveyor from at least one client device connected to the network.

The present embodiments prevent a person from coming into contact with silica dust, which may cause health issues.

The present embodiments take the danger of having a person in the high pressure danger zone/area.

The present embodiments keep a person from coming into direct contact with corrosive/toxic dust from dry chemical.

Automation of the present embodiment makes the dosing precise for a well.

The present embodiment is more cost effective because it eliminates the need of having two individuals at a location where dry chemicals could explode.

The following terms can be used herein:

The term "attaching device" refers to clips, clamps or threaded carabiners or similar adjustable fastening devices.

The term "bottom brace assembly" refers to an assembly, which forms the bottom of the cart for supporting the rear frame, vertical supports, vertical guide, and moveable hopper.

The term "flow controller" refers to a computer controlled volumetric or gravimetric metering device with sensors that can not only detect minute flow rates of 0.5 pounds per minute, but can identify flows of up to 20 pounds per hour.

The term "hopper brace" refers to brace positioned between the movable hopper and to the sliding locking assembly. It can be channel steel or steel tubing having a length from 4 inches to 24 inches and a diameter, sufficient to position the hopper centrally without deforming given the vibrations present in the hopper.

The term "hoist" refers to a hopper brace fixedly attached to the movable hopper and to the sliding locking assembly using a cable secured to an attaching device for raising and lowering the moveable hopper. The hoist includes a sliding locking assembly brace, a pair of sheaves, and a winch.

The term "moveable hopper" refers to tapered metal container that has a larger inlet, termed herein "a flared inlet" that becomes smaller in diameter to an outlet. The flared inlet can have a diameter 10% to 30% larger in diameter than the outlet. The moveable hopper can be steel or a non-deforming plastic capable of sustaining impacts and high temperatures without changing shape.

The term "rear frame" refers to the back of the cart. The rear frame includes a vertical guide and supports the rear frame wheels.

The term "screw conveyor" can refer to a motorized auger connected to the outlet of the moveable hopper for transferring dry chemicals from the hopper to a conveyor or another device, such as a storage tank or a production well. The screw conveyor is operated by a motor with a transmission.

The term "sliding locking assembly" refers to a sliding locking assembly attached to the first and second vertical supports for sliding up and down the vertical supports. The sliding locking assembly slides up and down the vertical guide simultaneously with the first and second vertical supports. Sleeves are critical members of the sliding locking assembly for sliding evenly and smoothly.

The term "top frame" refers to a top of the cart. The top frame has top central brace connected to the rear frame and to each of the first vertical support, the second vertical support, and the second sheave of the pair sheaves for supporting the hoist.

The term "U brace" refers to a metal structure integral with and extending from a plane of the bottom brace assembly to allow the moveable hopper to become adjacent to a bottom or ground without losing strength in the frame or obstructing the orientation of the screw conveyor. The U brace provides strength and a channel simultaneously.

The term "vertical support" refers to the front of the cart. The vertical supports allow the sliding locking assembly to be raised and lowered.

Figure 1:
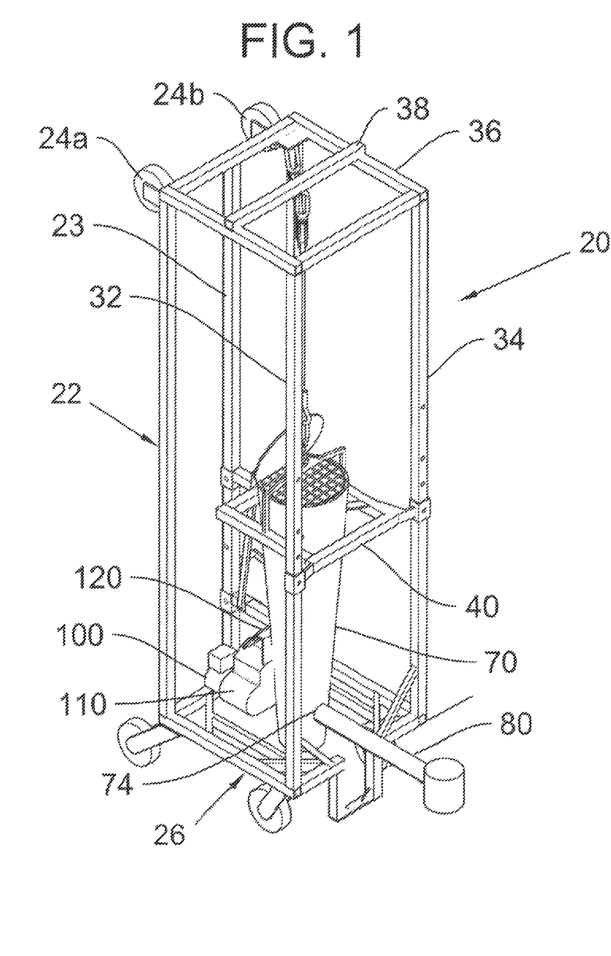
FIG. 1 depicts the portable dry chemical delivery robot according to one or more embodiments.

Now turning to the Figures, FIG. 1 depicts the portable dry chemical delivery robot 200.

The portable dry chemical delivery robot 200 has a cart 20.

The cart contains a rear frame 22 with a vertical guide 23. The vertical guide has aligned pinholes and two rear frame wheels 24a to 24b.

In embodiments, the rear frame 22 can be rectangular and telescoping with a length from five feet to twelve feet long.

In embodiments, the rear frame 22 can be made of steel square tubing.

A bottom brace assembly 26 attached at a right angle to the rear frame 22.

A first vertical support 32 and a second vertical support 34 are connected to the bottom brace assembly 26.

In embodiments, the first vertical supports can be made of steel.

In embodiments, the first and second vertical supports have a thinner wall thickness than the rear frame.

A top frame 36 with a top central brace 38 is connected to the rear frame 22 and to each of the first vertical support 32 and second vertical support 34.

The top frame can have a length from four feet to six feet and width four feet to six feet.

In embodiments, the top frame can be made from square tubing with a two inch outer diameter with a wall thickness of ¼ inch to two inches.

The square tubing can be made of steel.

In embodiments, the square tubing of each member of the cart can be the same size.

A sliding locking assembly 40 is attached to the first vertical support 32 and second vertical support 34 for sliding up and down the vertical supports.

A hoist 60 is mounted to the top central brace 38.

A moveable hopper 70 has a flared inlet tapered to an outlet 74. The moveable hopper 70 is connected to the hoist 60 and contained within the cart 20.

The moveable hopper can be from three feet to five feet in length from inlet to outlet.

In embodiments, the hopper can hold from 100 pounds to 150 pounds of dry chemicals.

A screw conveyor 80 is connected to outlet 74 of the moveable hopper 70.

The screw conveyor is an auger.

In embodiments, the screw conveyor can operate at variable rates of speed.

A motor 100 with a transmission 110 connected to the screw conveyor 80. The motor is engaged by a remote power supply.

A flow controller 120 is connected to the motor 100 for regulating operation of the screw conveyor 80. The flow controller 120 is in communication with a network for providing both local and remote control of the screw conveyor from at least one client device connected to the network.

Figure 2:
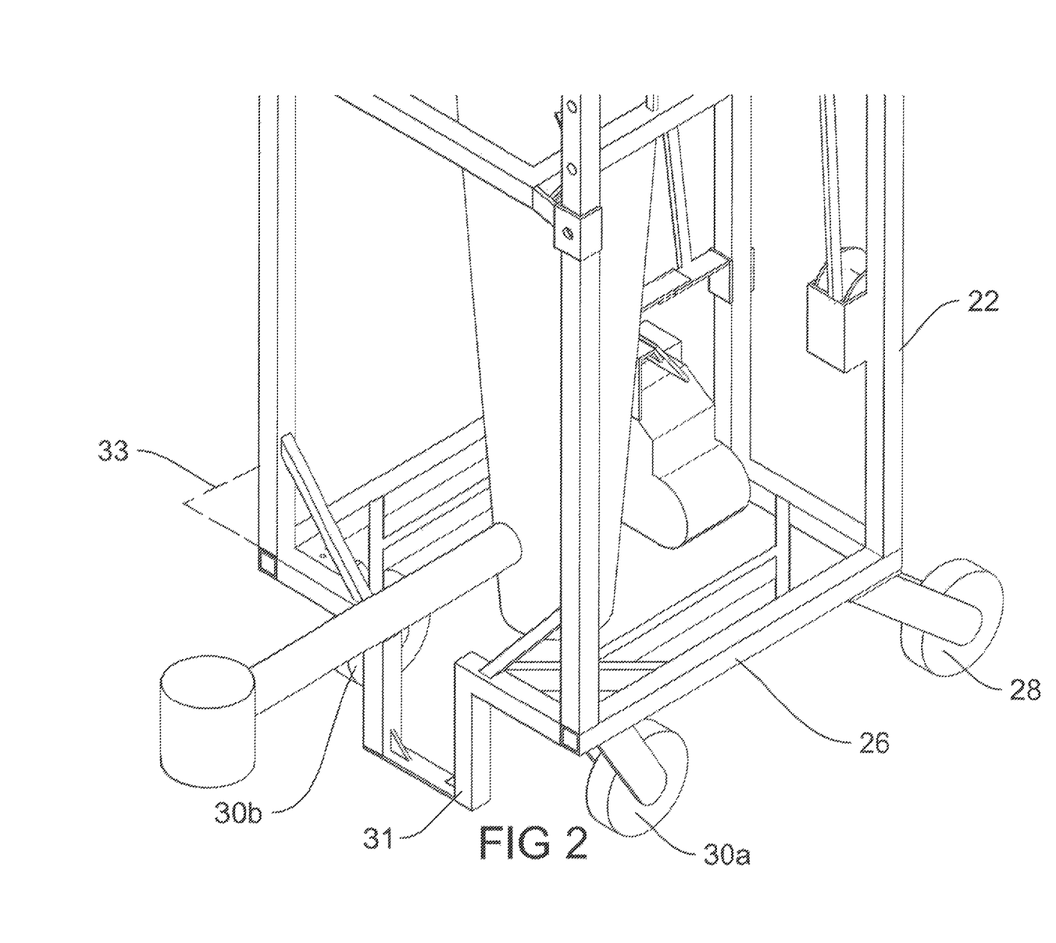
FIG. 2 depicts details of the bottom brace assembly according to one or more embodiments.

FIG. 2 depicts details of the bottom brace assembly according to one or more embodiments.

The bottom brace assembly 26 is attached at a right angle to the rear frame 22. The bottom brace assembly includes two angled wheels 28a configured to support both the rear frame 22 and the bottom brace assembly 26. Also, two bottom wheels 30a and 30b support the bottom brace assembly 26 and a U brace 31 integral with and extending from a plane 33 of the bottom brace assembly 26.

Figure 3:
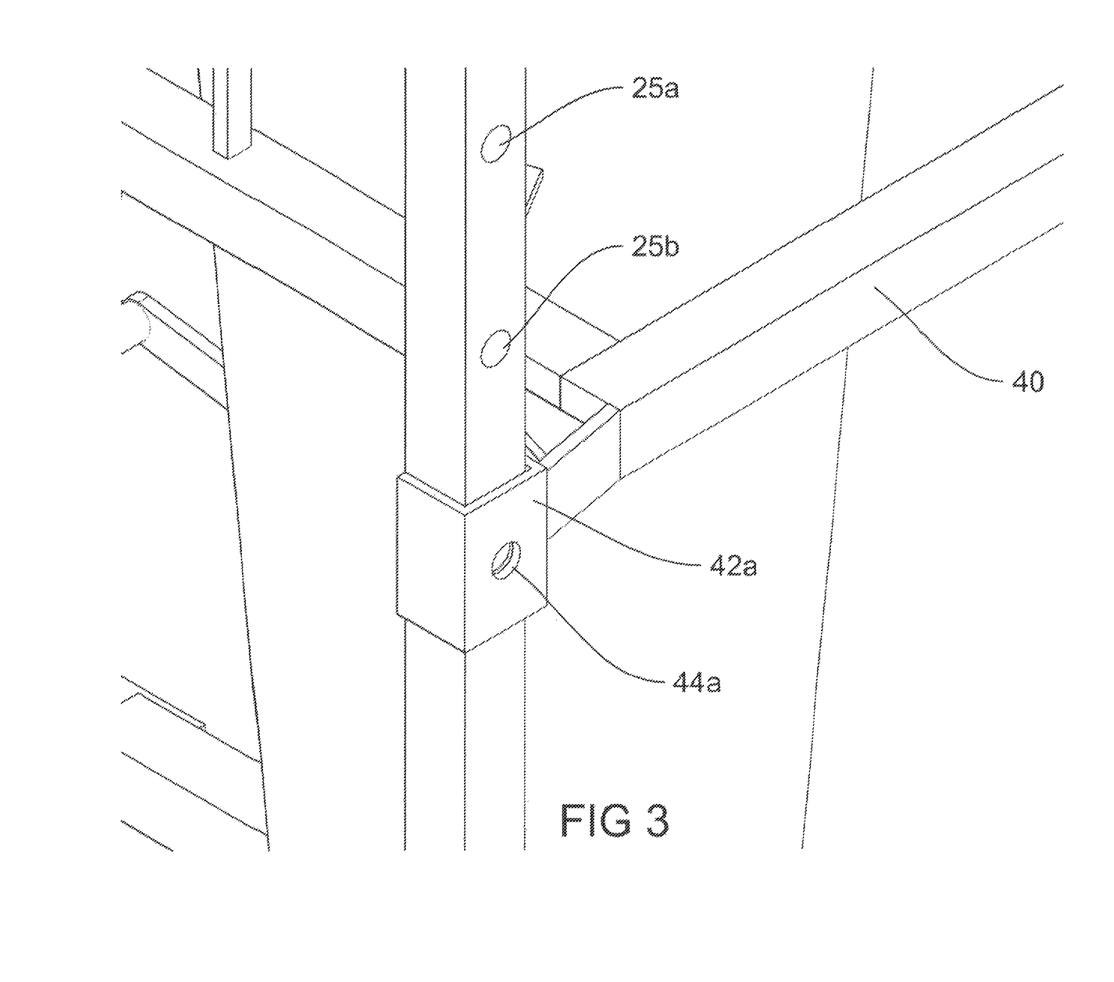
FIG. 3 depicts a sliding locking assembly according to one or more embodiments.

FIG. 3 depicts a sliding locking assembly 40.

The sliding locking assembly 40 includes a plurality of beams 41a-41d.

In embodiments, a plurality of sleeves 42a is integrally attached to a pair of beams 41a and 41d. Each sleeve 42a is configured to slide around one of the vertical supports or the vertical guide.

Each sleeve 42a has a pair of aligned locking holes 44a to engage holding pin through the sleeve and through a pair of aligned pinholes 25a and 25b in the vertical guide and vertical support.

In embodiments, the sliding locking brace can have a rectangular shape.

Figure 4A:
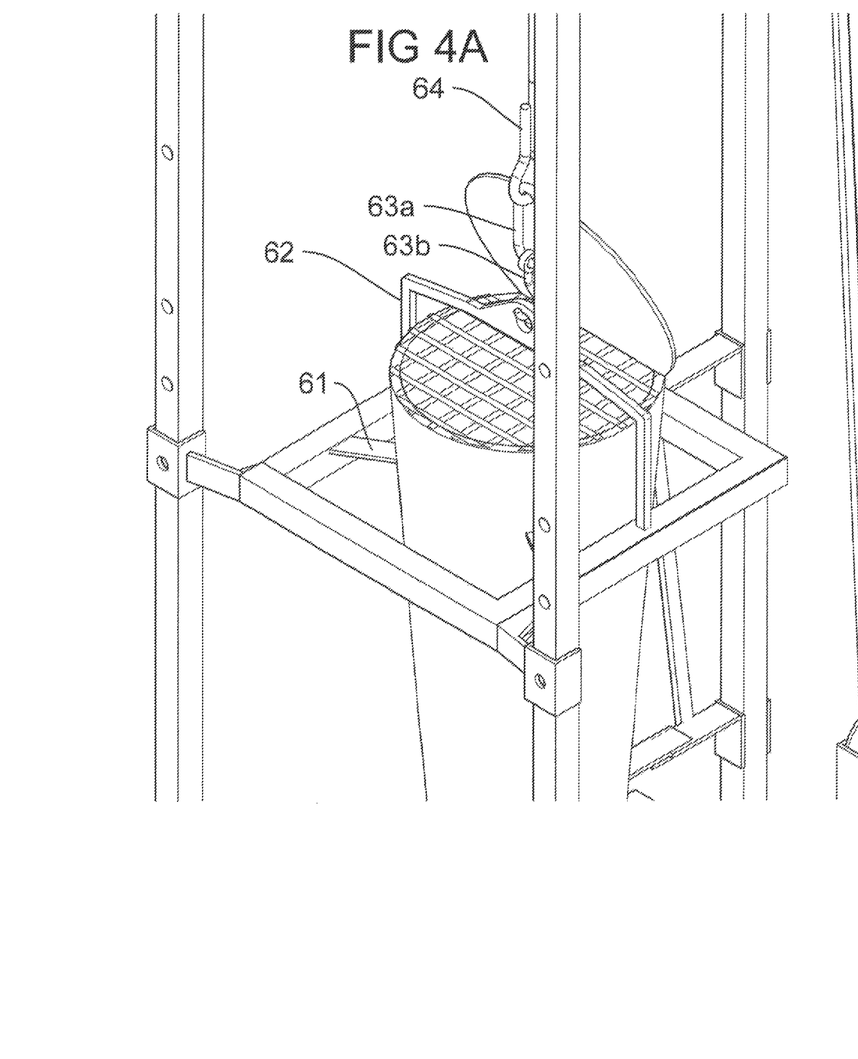
FIGS. 4A and 4B depict details of the hoist according to one or more embodiments.
Figure 4B:
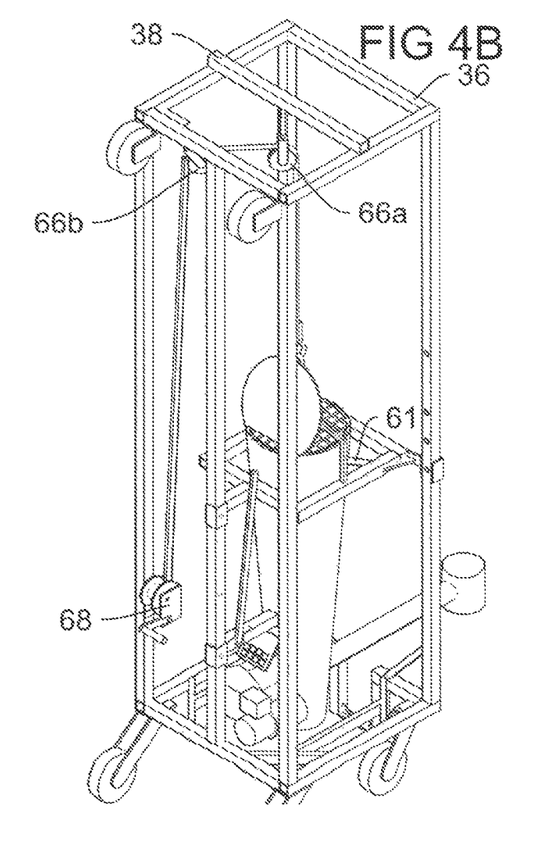

FIGS. 4A and 4B depict details of the hoist according to one or more embodiments.

The hoist 60 includes a hopper brace 61 fixedly attaching the movable hopper to the sliding locking assembly.

In embodiments, the dry chemical delivery robot can have three hopper braces.

A sliding locking assembly brace 62 fixedly attaches to sliding locking assembly.

An attaching device 63a and 63b is attached to the sliding locking assembly brace 62.

In embodiments, cable 64 is secured to the attaching device 63a and 63b;

A first sheave 66a is attached to the top central brace 38 receiving the cable 64. The second sheave 66b is attached at an intersection of two members of the top frame 36 excluding the top central brace 38 receiving the cable 64 from the first sheave 66a.

A winch 68 receives the cable 64 from the second sheave 66b enabling the hopper to be raised and lowered within the cart.

Figure 5:
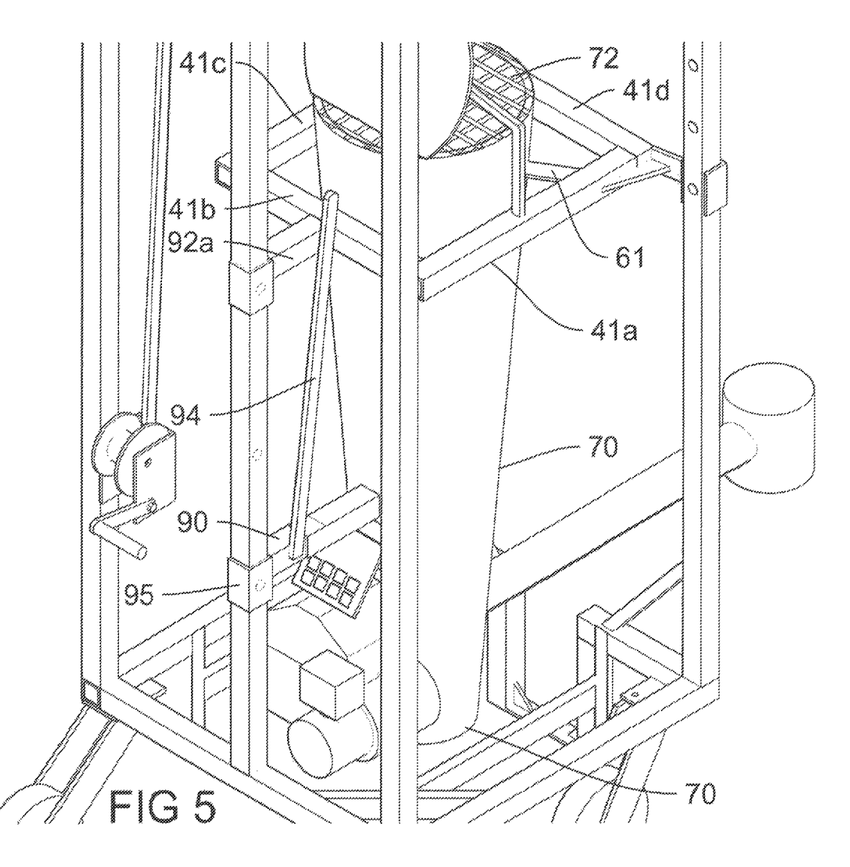
FIG. 5 depicts a moveable hopper with hopper sway brace according to one or more embodiments.

FIG. 5 depicts a moveable hopper 70 with a flared inlet 72, which contains a hopper sway brace 90.

The hopper sway brace 90 contains alignment beams 92a to 92d connected to beams 41a to 41d.

A sway beam 94 is connected to the alignment beam 92a at an angle from 90 to 60 degrees (75 degrees) between the hopper and the vertical guide 23.

A sway sleeve 95 is integrally attached to the sway beam 94. The sway sleeve 95 is configured to slide around the vertical guide.

Figure 6:
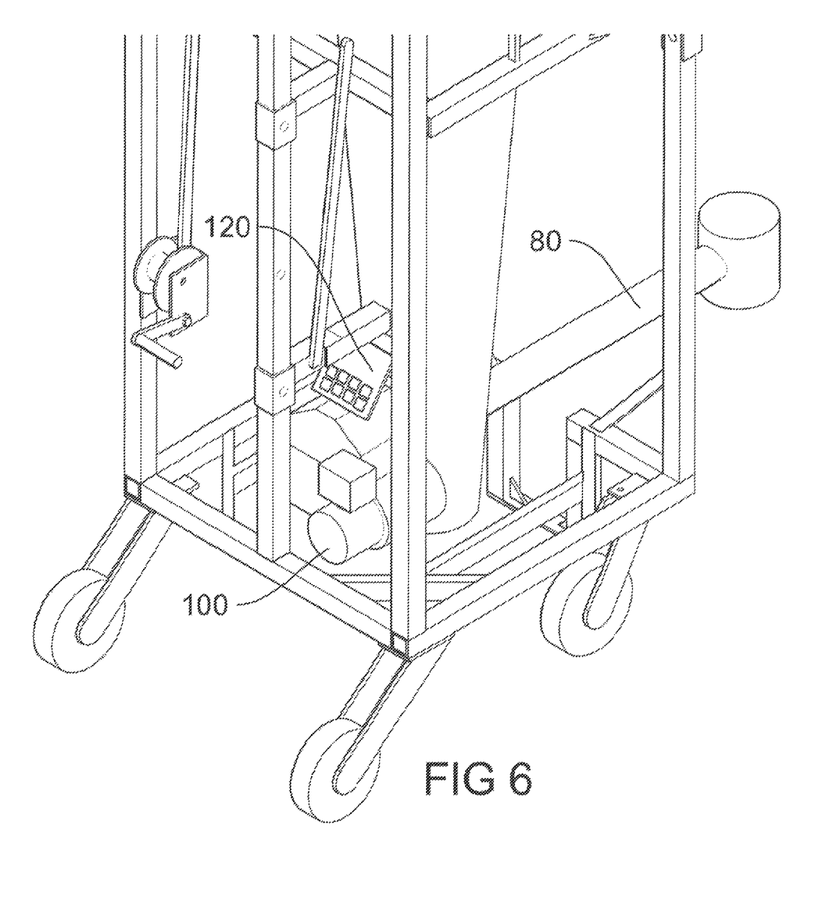
FIG. 6 depicts a detail of the screw conveyor, motor with transmission according to one or more embodiments.

FIG. 6 depicts a detail of the screw conveyor 80, the motor 100 with transmission according to one or more embodiments.

In embodiments, a flow controller 120 is connected to the motor 100 for regulating operation of the screw conveyor 80.

Figure 7:
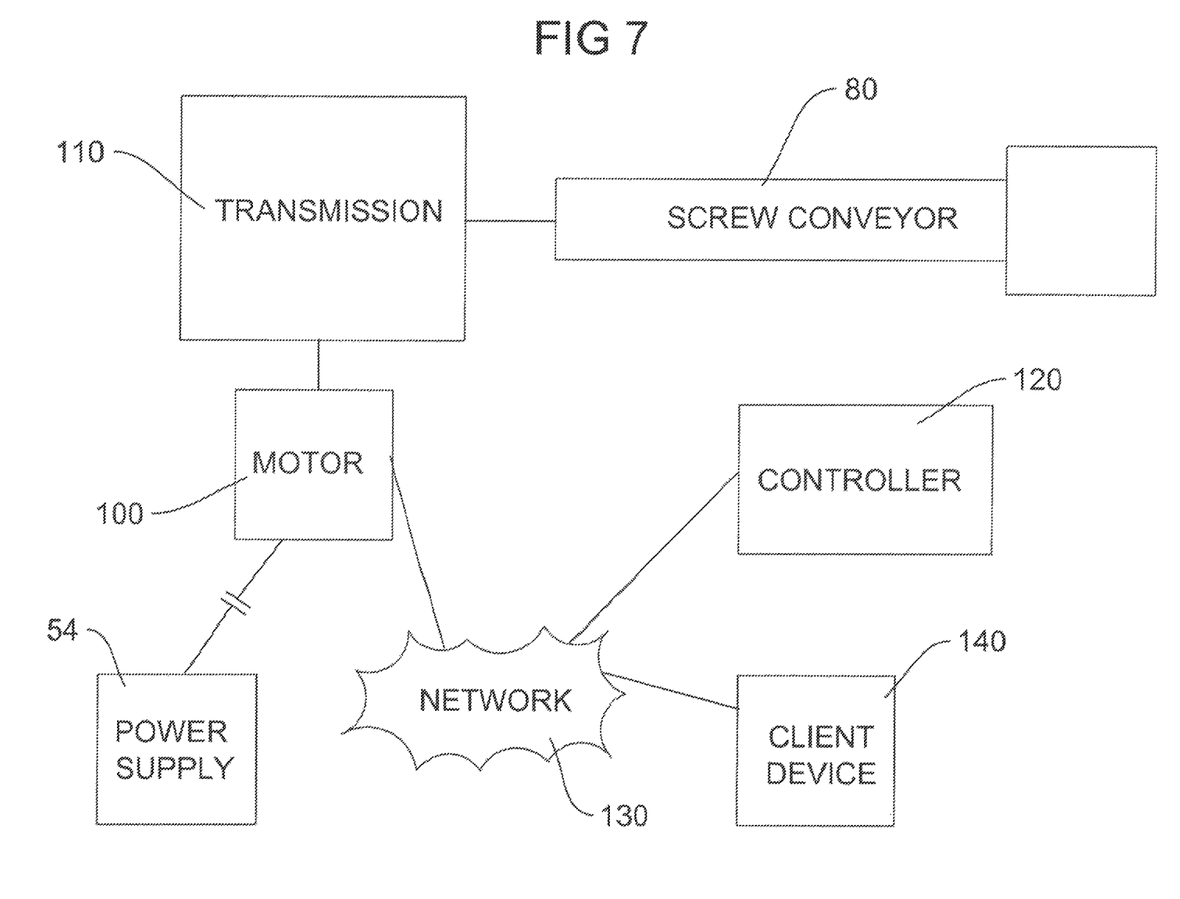
FIG. 7 depicts a diagram of the flow controller according to one or more embodiments.

FIG. 7 depicts a diagram of the flow controller 120.

A flow controller 120 is connected to the motor 100 with transmission 110 for regulating operation of the screw conveyor 80. The flow controller in communication with a network 130 for providing both local and remote control of the screw conveyor 80 from at least one client device 140 connected to the network 130.

In embodiments, the motor is engaged by a remote power supply 54.

In embodiments, the remote power supply can be a generator, a battery, a plurality of batteries connected in series or a 110 or 220 volt supply from a power grid.

Figure 8:
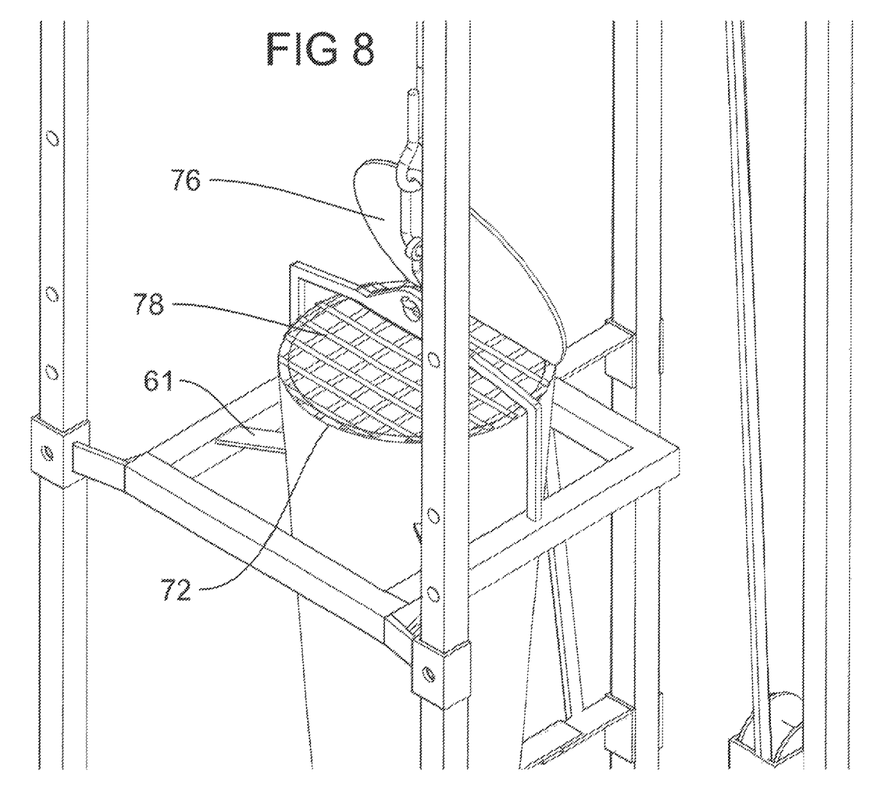
FIG. 8 depicts a detail of the lid and grate according to one or more embodiments.

FIG. 8 depicts a detail of the lid and grate.

The portable dry chemical delivery robot contains a lid 76 positioned over the flared inlet 72.

In embodiments, a grate 78 disposed over flared inlet 72 preventing large objects from entering the hopper.

EXAMPLES

Example 1

A portable dry chemical delivery robot of this invention can be ten feet tall, three feet wide and three feet deep.

The robot of this example has a cart 20 to support a moveable hopper.

The cart is made up of a rear frame 22 made up of a first and second vertical support with a vertical guide 23 positioned between the first and second vertical supports. The vertical guide can be nine feet long in this example. The vertical guide can have three pinholes, but more can be used. The vertical guide pinholes align with holes in the sleeve of the sliding locking assembly. The cart also has two rear frame wheels 24a and 24b can have a diameter 4 inches. The cart rear frame wheels are positioned in this example proximate the end of the rear frame furthest from a bottom brace assembly of the cart. In this example, the cart rear frame wheels can be welded to the rear frame.

The bottom brace assembly 26 is attached at a right angle to the rear frame 22.

The bottom brace assembly can be three feet wide by three feet deep.

The bottom brace assembly has two angled wheels 28. The angled wheels are special in that each angled wheel is configured to support both the rear frame and the bottom brace assembly.

Two additional bottom wheels 30a and 30b are used for supporting the bottom brace assembly and a U brace 31 integral with and extending from a plane 33 of the bottom brace assembly.

The additional bottom wheels can be casters.

A first vertical support 32 and a second vertical support 34 are used and have identical lengths. Each vertical support is made from square tubing, having a diameter of for example, two inches, and each vertical support is connected to the bottom brace assembly, such as by welding.

The invention includes a top frame 36 with a top central brace 38. The top frame is connected to the rear frame at one end. The top frame also connects to each of the first vertical support and the second vertical support at the ends of the vertical supports. The top frame can be welded to the components in this example.

The invention of this example includes a sliding locking assembly 40 attached to the first vertical support and the second vertical support.

The sliding locking assembly slides up and down the first vertical support, the second vertical support, and the vertical guide 23 such as using sleeves or another connecting member.

The sliding locking assembly has a hoist with winch, wire cable, and sheaves and a hook or similar connector, that can connect to a moveable hopper via the top central brace.

Contained within the cart is a moveable hopper 70 with a flared inlet 72 tapering to an outlet 74.

The hook or connector of the hoist of the sliding locking assembly engages the hopper within the cart enabling the hopper to be moved up and down within the cart. The moveable hopper can move from 1 foot to 5 feet.

A screw conveyor 80 such as a motorized auger is connected to the outlet of the moveable hopper for transferring dry chemicals from the hopper to a conveyor or another device, such as a storage tank or a production well. The screw conveyor is operated by a motor 100 with transmission 110. The motor can operate the screw portion of the screw conveyor at rates up to 600 rpm. The motor can connect to a remote power supply 54 and in this embodiment, can be remotely operated using client devices connected to a network, far from the cart.

A flow controller 120 connected to the motor 100 is used to regulate operation of the screw conveyor.

The flow controller is in communication with a network 130 for providing both local and remote control of the screw conveyor from at least one client device 140 connected to the network.

The network can be a global communication network, such as the interact, or a satellite network, a cellular network, a local area network, a wide area network, or combinations of these networks.

With this robot, a user can safely flow dry chemicals using a portable robot, monitor and alter rates of flow adjusting flow rates according to real time changes in well profiles, and fluid used in a well. The robot can change flow rates automatically, from one pound per hour to 42 pounds per hour with remote commands, keeping a worker safe in the field from exploding powder.

Example 2

In another embodiment, a screw conveyor 80 such as a motorized auger can be connected to the outlet of the moveable hopper for transferring dry chemicals from the hopper to a conveyor or another device, such as a storage tank or a production well. The screw conveyor can be operated by a motor 100 with transmission 110. The motor can operate the screw portion of the screw conveyor at rates up to 800 rpm. The motor can connect to a remote power supply 54 and can be remotely operated using client devices connected to a network.

A flow controller 120 connected to the motor 100 is used to regulate operation of the screw conveyor.

The flow controller is in communication with a network 130 for providing both local and remote control of the screw conveyor from at least one client device 140 connected to the network.

The network can be a global communication network, such as the interact, or a satellite network, a cellular network, a local area network, a wide area network, or combinations of these networks.

With this robot, a user can safely flow dry chemicals using a portable robot, monitor and alter rates of flow adjusting flow rates according to real time changes in well profiles, and fluid used in a well. The robot can change flow rates automatically, from one half pound per hour to 25 pounds per hour with remote commands, keeping a worker safe in the field from exploding powder.

Example 3

In embodiments, a flow controller 120 connected to the motor 100 is used to regulate operation of the screw conveyor.

The flow controller is in communication with a network 130 for providing both local and remote control of the screw conveyor from at least one client device 140 connected to the network.

With this robot, a user can safely flow dry chemicals using a portable robot, monitor and alter rates of flow adjusting flow rates according to real time changes in well profiles, and fluid used in a well. The robot can change flow rates automatically, from one quarter pound per half hour to 17 pounds per half hour with remote commands, keeping a worker safe in the field from exploding powder.

Example 4

In embodiments, a flow controller 120 connected to the motor 100 is used to regulate operation of the screw conveyor.

The flow controller is in communication with a network 130 for providing both local and remote control of the screw conveyor from at least one client device 140 connected to the network.

With this robot, a user can safely flow dry chemicals using a portable robot, monitor and alter rates of flow adjusting flow rates according to real time changes in well profiles, and fluid used in a well. The robot can change flow rates automatically, from four pounds per three hours to 150 pounds per three hours with remote commands, keeping a worker safe in the field from exploding powder.

While these embodiments have been described with emphasis on the embodiments, it should be understood that within the scope of the appended claims, the embodiments might be practiced other than as specifically described herein.

What is claimed is:

1. A portable dry chemical delivery robot comprising:
   a. a cart comprising:
      (i) a rear frame comprising a vertical guide with aligned pin holes and two rear frame wheels;
      (ii) a bottom brace assembly attached at a right angle to the rear frame comprising two angled wheels configured to support both the rear frame and the bottom brace assembly and two bottom wheels for supporting the bottom brace assembly and a U brace integral with and extending from a plane of the bottom brace assembly;
      (iii) a first vertical support and a second vertical support connected to the bottom brace assembly;
      (iv) a top frame with a top central brace connected to the rear frame and to each of the first vertical support and the second vertical support;
      (v) a sliding locking assembly attached to the first vertical support, the second vertical support, and the vertical guide for sliding up and down the first vertical support, the second vertical support, and the vertical guide;
   b. a hoist mounted to the top central brace;
   c. a moveable hopper with a flared inlet tapering to an outlet, the moveable hopper connected to the hoist and contained within the cart;
   d. a screw conveyor connected to the outlet of the moveable hopper;
   e. a motor with transmission connected to the screw conveyor, the motor engaged by a remote power supply; and
   f. a flow controller connected to the motor for regulating operation of the screw conveyor, the flow controller in communication with a network;
   g. a plurality of client device connected to the network providing both local and remote control of the screw conveyor wherein each client device contains a command screen enabling increase of flow rates, decrease of flow rates, stop and removal of dry chemicals from the moveable hopper.

2. The portable dry chemical delivery robot of claim 1, wherein the sliding locking assembly comprises:
   a. a plurality of beams;
   b. a plurality of sleeve integrally attached to a pair of beams of the plurality of beams, each sleeve of the plurality of sleeves configured to slide around the first vertical support, the second vertical support, and the vertical guide, each sleeve of the plurality of sleeves having a pair of aligned locking holes to engage a holding pin through the sleeve of the plurality of sleeves and through a pair of aligned pin holes in the vertical guide or the vertical support.

3. The portable dry chemical delivery robot of claim 1, comprising a hopper sway brace comprising:
   a. alignment beams connected to the beam of the plurality of beams;
   b. a sway beam connected to the alignment beams at an angle between 90 and 60 degrees (75 degrees) between the moveable hopper and the vertical guide;
   c. a sway sleeve integrally attached to the sway beam, the sway sleeve configured to slide around the vertical guide.

4. The portable dry chemical delivery robot of claim 1, wherein the hoist comprises:
   a. a hopper brace fixedly attaching the movable hopper to the sliding locking assembly;
   b. a sliding locking assembly brace fixedly attached to sliding locking assembly;
   c. an attaching device attached to the hopper brace;
   d. a cable secured to the attaching device;
   e. a first sheave attached to the top central brace receiving the cable and the second sheave attached at an intersection of two members of the top frame excluding the top central brace receiving the cable from the first sheave;
   f. a winch, wherein the winch receives the cable from the second sheave enabling the moveable hopper to be raised and lowered within the cart.

5. The portable dry chemical delivery robot of claim 1, comprising a lid positioned over the flared inlet.

6. The portable dry chemical delivery robot of claim 1, comprising a grate disposed over flared inlet preventing large objects from entering the moveable hopper.

* * * * *